(12) United States Patent
Bostrom

(10) Patent No.: US 12,703,302 B2
(45) Date of Patent: Aug. 11, 2026

(54) REARVIEW ASSEMBLY

(71) Applicant: GENTEX CORPORATION, Zeeland, MI (US)

(72) Inventor: David M. Bostrom, Zeeland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 273 days.

(21) Appl. No.: 18/461,568

(22) Filed: Sep. 6, 2023

(65) Prior Publication Data

US 2024/0083359 A1 Mar. 14, 2024

Related U.S. Application Data

(60) Provisional application No. 63/405,127, filed on Sep. 9, 2022.

(51) Int. Cl.
*B60R 1/08* (2006.01)
*B60R 11/00* (2006.01)
*B60R 11/04* (2006.01)

(52) U.S. Cl.
CPC .............. *B60R 1/088* (2013.01); *B60R 11/04* (2013.01); *B60R 2011/0064* (2013.01); *B60R 2011/008* (2013.01); *B60R 2300/8006* (2013.01)

(58) Field of Classification Search
None
See application file for complete search history.

(56) References Cited

U.S. PATENT DOCUMENTS 9,475,431 B2 * 10/2016 Brummel ............. G02B 6/0096
2003/0103142 A1 * 6/2003 Hitomi .................... B60R 11/04 348/148
2016/0236620 A1 8/2016 Gómez Timoneda et al.
2017/0036603 A1 2/2017 Brummel et al.
2018/0020139 A1 * 1/2018 Tang ........................ H04N 5/77
2018/0134218 A1 * 5/2018 Lettis ..................... H04N 23/51
(Continued)

FOREIGN PATENT DOCUMENTS

CN 206749660 U 12/2017
JP 1975156953 U 12/1975
(Continued)

OTHER PUBLICATIONS

International Search Report dated Dec. 21, 2023, for corresponding PCT application No. PCT/US2023/073503, 11 pages.
(Continued)

*Primary Examiner* — Ryan Crockett
(74) *Attorney, Agent, or Firm* — Price Heneveld LLP; Brian James Brewer

(57) ABSTRACT

A rearview assembly is disclosed, which may comprise a housing, a transflective element, and a mount. The housing may form a cavity and an opening. The transflective element may be substantially disposed in the opening. The mount assembly may have a first and second ends. The first end may be configured to secure to a vehicle. The second end may be secured to support the housing and may comprise a bracket extending into the cavity. Additionally, at least one of an imager and a light source may be disposed within the cavity and secured to the bracket. The bracket may remain in a substantially fixed position when the mount assembly is secured to the vehicle and the housing is articulated.

19 Claims, 3 Drawing Sheets

(56) References Cited

U.S. PATENT DOCUMENTS

| | | | | |
|---|---|---|---|---|
| 2018/0257566 | A1* | 9/2018 | Hamlin | B60R 1/12 |
| 2018/0354420 | A1* | 12/2018 | Hallack | B60R 1/12 |
| 2020/0301525 | A1 | 9/2020 | Tonar et al. | |
| 2020/0317129 | A1* | 10/2020 | Englander | B60R 1/04 |
| 2021/0323477 | A1* | 10/2021 | LaCross | B60R 1/04 |
| 2022/0080891 | A1* | 3/2022 | Lundy | B60R 1/04 |
| 2023/0131471 | A1* | 4/2023 | Sobecki | B60R 1/04 348/148 |
| 2023/0137004 | A1* | 5/2023 | Huizen | H04N 25/10 348/77 |

FOREIGN PATENT DOCUMENTS

| | | | |
|---|---|---|---|
| JP | 2008284917 | A | 11/2008 |
| JP | 2008290545 | A | 12/2008 |
| JP | 2014-029556 | A | 2/2014 |
| JP | 2016-155545 | A | 9/2016 |
| JP | 2018172112 | A | 11/2018 |
| KR | 10-2006-0021837 | A | 3/2006 |
| WO | 2007/100921 | A2 | 9/2007 |
| WO | 2017073064 | A1 | 5/2017 |

OTHER PUBLICATIONS

Written Opinion dated Dec. 21, 2023, for corresponding PCT application No. PCT/US2023/073503, 4 pages.

* cited by examiner

REARVIEW ASSEMBLY

CROSS REFERENCE TO RELATED APPLICATIONS

This application claims priority under 35 U.S.C. § 119(e) to U.S. Provisional Application No. 63/405,127 filed on Sep. 9, 2022, entitled "Rearview Assembly," the disclosure of which is hereby incorporated by reference in its entirety.

FIELD OF INVENTION

The present invention relates, in general, to rearview assemblies and, more particularly, to rearview assemblies with cameras.

BACKGROUND OF INVENTION

Demand for advanced technological features in vehicles is ever increasing. A significant number of these features, such as those based on cabin or driver monitoring, require cameras. Further, these cameras often need a field of view directed interior the vehicle. Accordingly, it is often necessary or advantageous to position these cameras in close proximity to or in the area occupied by the rearview assembly. Additionally, it is important that these cameras be incorporated into the vehicle interior in an aesthetically pleasing manner. Thus, a desirable location for such a camera may be within the rearview assembly, behind and looking through a transflective element thereof. However, one drawback of putting the camera in such a location is that rearview assemblies may be moved by drivers in order to achieve desired fields of view. This movement of the rearview assembly, in turn, changes the camera's position and/or articulation, which interferes with some advanced features of many driver and/or cabin monitoring systems due to an unknown position or orientation within the vehicle. Accordingly, there is a need for improved camera integration into vehicles, particularly for cabin and/or driver monitoring systems.

SUMMARY

In accordance with the present disclosure, the problems associated with integrating cameras into vehicles have been substantially reduced or eliminated.

According to one aspect of the present disclosure, a rearview assembly is disclosed. The rearview assembly is disclosed may comprise a housing, a transflective element, and a mount. The housing may form a cavity and an opening. The transflective element may be substantially at least one of disposed in, proximate to, and aligned with the opening. In some embodiments, the transflective element is a variably transmissive electro-optic element. The mount assembly may have a first and second ends. The first end may be configured to secure to a vehicle. The second end may be secured to support the housing and may comprise a bracket extending into the cavity. Additionally, at least one of an imager and a light source may be disposed within the cavity and secured to the bracket. In some embodiments, the light source may be configured to project structured light into a passenger compartment of the vehicle. The bracket may remain in a substantially fixed position when the mount assembly is secured to the vehicle and the housing is articulated.

In some embodiments, the second end may comprise a ball portion. Additionally, the housing may further comprise a cup configured to receive and grip the ball portion, at least in part. Further, the housing may articulate relative the mount assembly at an interface between the ball portion and the cup. In some such embodiments, the cup may comprise a plurality of fingers substantially extending about, at least part of, the ball portion. The plurality of fingers may retain the ball portion within the cup. Additionally or alternatively, the cup may comprise a base portion and have an aperture leading to the cavity. In such an embodiment, the bracket may extend into the cavity via the aperture.

These and other aspects, objects, and features of the present disclosure will be understood and appreciated by those skilled in the art upon studying the following specification, claims, and appended drawings. It will also be understood that features of each embodiment disclosed herein may be used in conjunction with, or as a replacement for, features in other embodiments.

Figure 4:
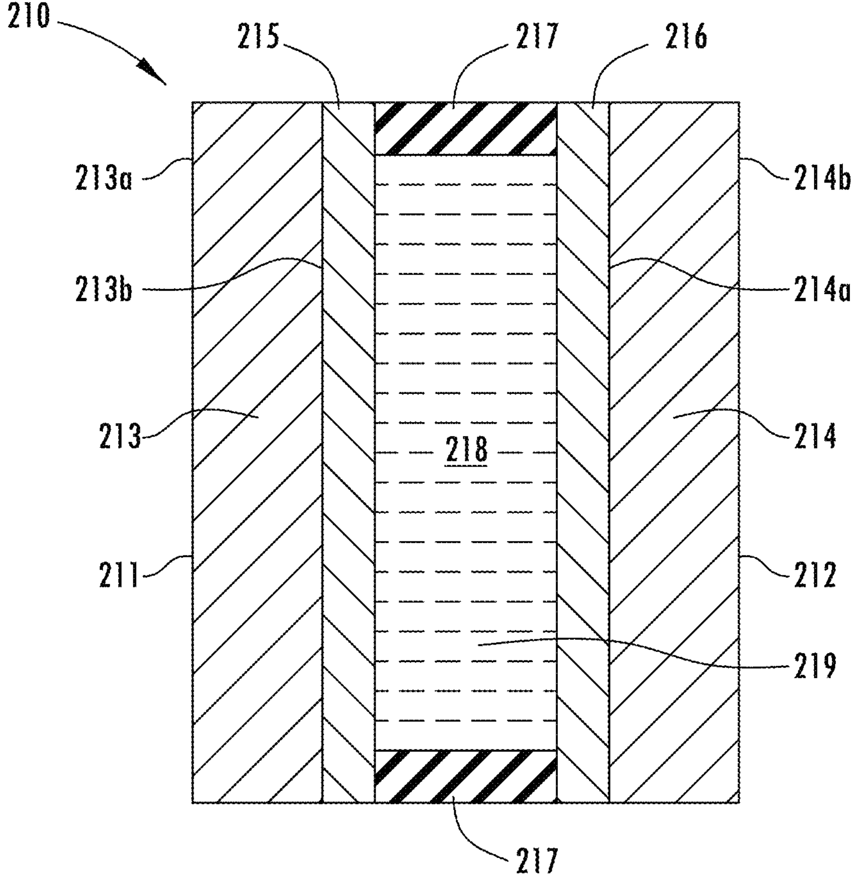

FIG. **3*a*** is a representation of a cup of an embodiment of a rearview assembly;

FIG. **3*b* is an exploded perspective view of a bracket, a cup, and a mount of an embodiment of a rearview assembly; and FIG. 4** is a cross-sectional schematic representation of an embodiment of a transflective element.

DETAILED DESCRIPTION

For the purposes of description herein, the specific devices and processes illustrated in the attached drawings and described in this disclosure are simply exemplary embodiments of the inventive concepts defined in the appended claims. Hence, specific characteristics relating the embodiments disclosed herein are not limiting, unless the claims expressly state otherwise.

Figure 1:
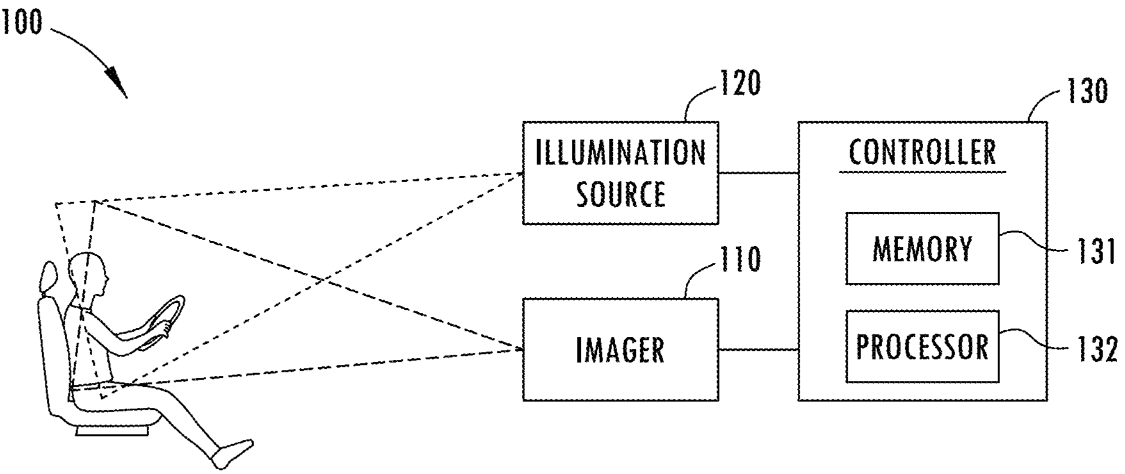
FIG. 1 is a schematic representation of a monitoring system.
Figure 2:
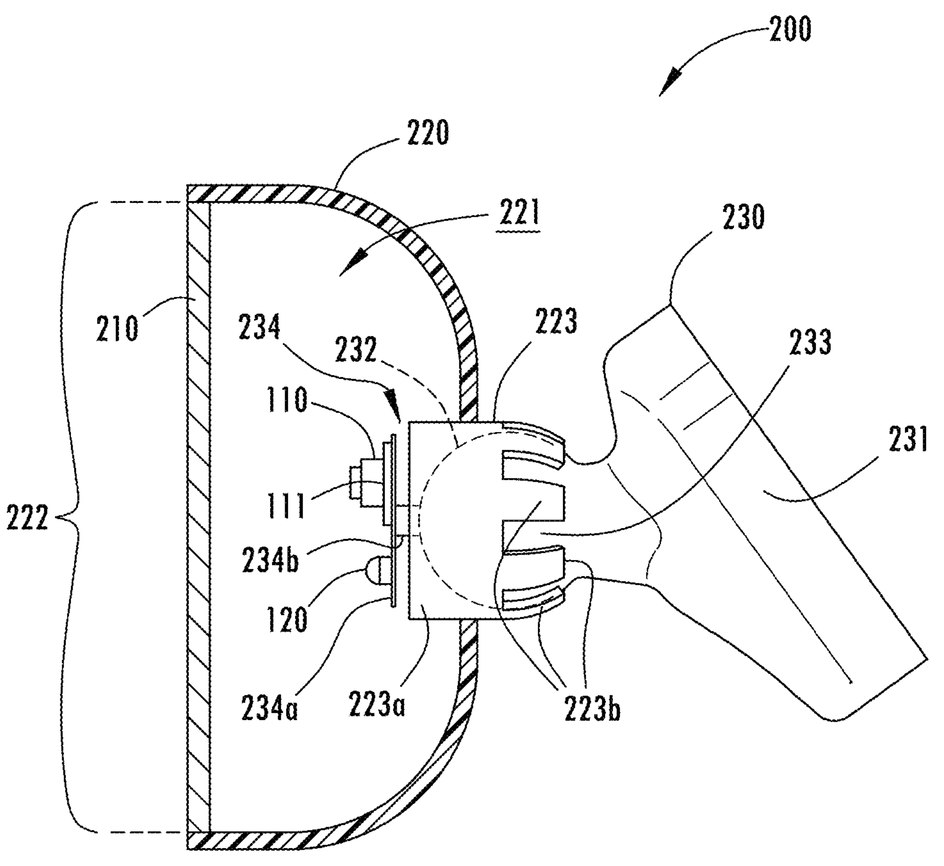
FIG. 2 is a cross-sectional schematic representation of an embodiment of a rearview assembly.
Figure 3A:
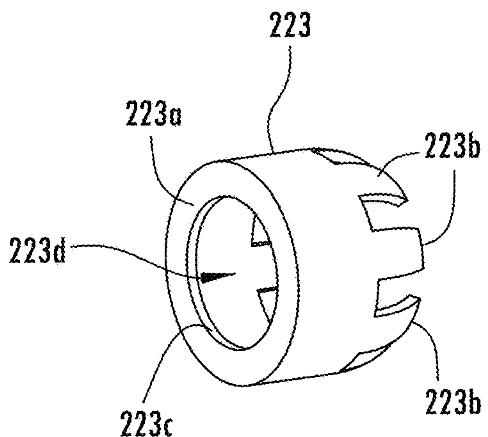
Figure 3B:
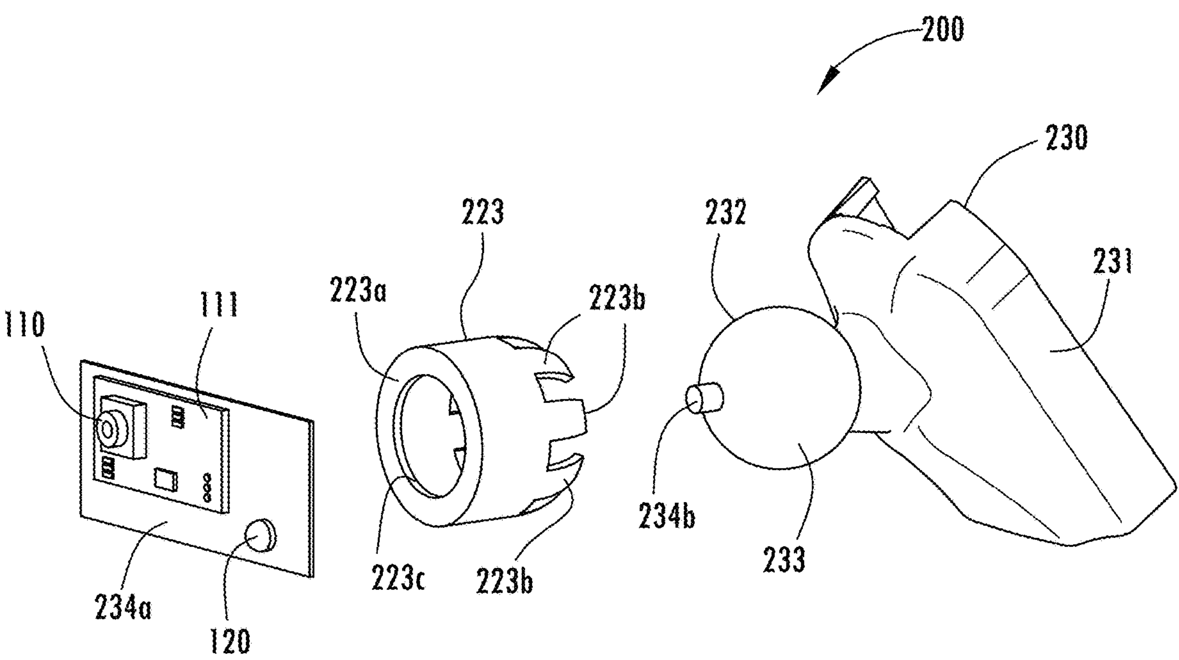

The present disclosure is directed to a monitoring system 100, as illustrated in FIG. 1. Monitoring system 100 may be associated with a vehicle. Accordingly, monitoring system 100 may be a driver and/or cabin monitoring system 100. Further, monitoring system 100 includes an imager 110, a light source 120, and/or a controller 130. Furthermore, one or more component of monitoring system 100 may be incorporated into a rearview assembly 200, various aspects of which are illustrated in FIGS. 2-**3*b***.

Imager 110 may be any device configured to capture light in a first wavelength range and produce an image. The image may be a digital image. In some embodiments, the first wavelength range may be in the infra-red and/or near infra-red regions of the electromagnetic spectrum. For example, imager 110 may be a camera. Accordingly, imager 110 may be a Semi-Conductor Charge-Coupled Device (CCD) or pixel sensor of Complementary Metal-Oxide-Semi-Conductor (CMOS) technology. Further, imager 110 may have a field of view of a scene. The scene may include all or part of a cabin passenger compartment of the vehicle.

Light source 120 may be configured to emit light having a second wavelength range. The second wavelength range may include or overlap with the first wavelength range. Accordingly, the second wavelength range may be in the infra-red and/or near infra-red regions of the electromagnetic spectrum. In some embodiments, the second wavelength range may be substantially centered around 810, 850, or 940 nm. The emitted light may be operable to substantially illuminate all or part of the passenger compartment. For example, light source 120, may comprise one or more light emitting diodes (LEDs); vertical cavity surface emitting lasers (VCSELs); or halogen, quartz, incandescent, or compact fluorescent ("CFL") light bulbs. Accordingly, light source 120 may be configured to illuminate the scene. In some embodiments, light source 120 may be configured to substantially illuminate the scene with structured light. The structured light, for example, may be a linear or a quasi-random array of dots.

Controller 130 may be communicatively connected to imager 110 and/or light source 120. Accordingly, controller 130 may be configured to receive captured images from imager 110. Further, controller 130 may comprise a memory 131 and/or a processor 132. Memory 131 may be configured to store one or more image analysis algorithm. The algorithms may be executed by processor 132. The algorithms, for example, may be configured to analyze the received images and make one or more determination based on the image. For example, the algorithm may be configured to determine a driver's attentiveness.

Memory 131 may be a non-transitory computer-readable media (CRM). Accordingly, memory 131 may be a tangible device may be configured to store one or more instructions, such as one or more algorithms, to provide for the configuration and operation of controller 130. Examples of memory 131 include conventional hard disks, solid-state memories, random access memories (RAM), read-only memory (ROM), erasable programmable read-only memory (EPROM), electronically erasable programmable read-only memory (EEPROM), optical or magnetic disks, dynamic random-access memory (DRAM).

Processor 132 may be communicatively connected to memory 131. Further, processor 132 may be any device or electronic circuit configured and/or operable to process or execute one or more sets of electronic instructions, such as the algorithm. These instructions may be stored in memory 131. Examples of processor 132 may include a central processing unit (CPU), a microprocessor, and/or an application specific integrated circuit (ASIC).

Rearview assembly 200 may be an interior rear-view assembly for the vehicle. As such, rearview assembly 200 may be configured to provide a driver with a view rearward relative the vehicle with which it is associated. Further, rearview assembly 200 may be substantially generally disposed within a forward area of the vehicle interior. Accordingly, rearview assembly 200 may be associated with the headliner or windshield of the vehicle. Additionally, rearview assembly 200 may comprise a transflective element 210, a housing 220, a mount assembly 230, and a bracket 234.

Transflective element 210 may have a first side 211 and a second side 212. First side 211 may be directed toward the driver, under normal operating conditions of rearview assembly 200 and/or the vehicle. Second side 212 may be opposite first side 211. Thus, second side 212 may be disposed in a first direction relative first side 211. The first direction may be defined as a direction substantially perpendicular to a planar extent of first side 211. Further, transflective element 210 may substantially reflect light impinging first side 211 while simultaneously substantially transmitting light therethrough. In other words, transflective element 210 may transmit light in the first direction while simultaneously reflecting light substantially to a second direction opposite the first direction. In some embodiments, transflective element 210 may have a variable reflectance. In such an embodiment, transflective element 210 may be electro-optic, as illustrated in FIG. 4. Accordingly, transflective element 210 may comprise a first substrate 213, a second substrate 214, a first electrode 215, a second electrode 216, a seal 217, a chamber 218, and/or an electro-optic medium 219.

First substrate 213 comprises a first surface 213*a* and a second surface 213*b* on opposite sides thereof. Second surface 213*b* may be disposed in the first direction relative first surface 213*a*. In some embodiments, first surface 111*a* may correspond to first side 211. Further, first substrate 213, may be fabricated from any of a number of materials that are transparent or substantially transparent in the visible region of the electromagnetic spectrum, such as borosilicate glass, soda lime glass, float glass, natural and synthetic polymeric resins, plastics, and/or composites. Substrate materials may be selected from any number of materials so long as the materials are substantially transparent and exhibit appropriate physical properties such as strength and tolerance to conditions of its environment, such as ultra-violet light exposure from the sun and temperature extremes.

Second substrate 214 is disposed in a substantially parallel, spaced apart relationship relative first substrate 213. Further, second substrate 214 comprises a third surface 214*a* and a fourth surface 214*b* on opposite sides thereof. Fourth surface 214*b* may be disposed in the first direction relative third surface 214*a*. In some embodiments, fourth surface 214*b* may correspond to second side 112. Additionally, second substrate 214 may be fabricated from the same or similar materials as that of first substrate 213.

First electrode 215 is an electrically conductive material associated with second surface 213*b*. The electrically conductive material of first electrode 215 may be substantially transparent in the visible region of the electromagnetic spectrum and generally resistant to corrosion from materials contained within the electro-optic element. The electrically conductive material may be a transparent conductive oxide (TCO), such as fluorine doped tin oxide (FTO), indium-doped oxide, doped zinc oxide, or other materials known in the art.

Similarly, second electrode 216 is an is an electrically conductive material associated with third surface 214*a*. Second electrode 216 may likewise be substantially transparent. Accordingly, the electrically conductive material of second electrode 216 may be fabricated from the same or similar materials as that of first electrode 215. In some embodiments, second electrode 216 may also be substantially reflective or comprise a substantially reflective layer. Accordingly, second electrode 216 may be transflective. In other embodiments, a reflector may be associated with second electrode 216 between electro-optic medium 219 and second electrode 216, with third surface 214*a* between second electrode 216 and second substrate 214, or with fourth surface 214*b* of second substrate 214. Typical reflective materials include chromium, rhodium, ruthenium, silver, aluminum, gold, platinum, palladium, nickel, molybdenum, and combinations thereof.

Seal 217 may be disposed in a peripheral manner to define chamber 218 between first substrate 213 and second substrate 214. Chamber 218 may be defined by seal 217 in conjunction with at least two of: first substrate 213, second substrate 214, first electrode 215, and second electrode 216. In some embodiments, chamber 218 may, more specifically, be defined by seal 217, first electrode 215, and second electrode 216. Accordingly, chamber 218 may be between the first and second electrodes 215, 216. Seal 217 may comprise any material capable of being adhesively bonded to the at least two of: first substrate 213, second substrate 214, first electrode 215, and second electrode 216, to in turn seal chamber 217 such that electro-optic medium 219 does not inadvertently leak out and/or such that electro-optic medium 219 is protected from exposure to water or oxygen.

Electro-optic medium 219 is disposed between the first and second electrodes 215, 216. Thus, electro-optic medium 219 may be disposed in chamber 218. Additionally, electro-optic medium 219 is electro-active. Therefore, electro-optic medium 219 is operable between activated and un-activated states in response to an electrical potential. Accordingly, electro-optic medium 219 may include, among other materials, electro-active anodic and cathodic materials. In some embodiments, the anodic and/or cathodic materials may be electrochromic. In other words, the electro-optic medium 219 may be electrochromic. Electrochromic means that upon activation, due to the application of an electronic voltage or potential, the electrochromic item may exhibit a change in absorbance at one or more wavelengths of the electromagnetic spectrum. Accordingly, the electro-optic medium 219 may be variably transmissive. The change in absorbance may be in the visible, ultra-violet, infra-red, and/or near infra-red regions. In other embodiments, electro-optic medium 219 may be a liquid crystal medium or a suspended particle medium. Electro-optic medium 219 may be fabricated from any one of a number of materials, including, for example, those disclosed in U.S. Pat. No. 6,433,914, entitled "Color-Stabilized Electrochromic Devices," which is herein incorporated by reference in its entirety.

Housing 220 may form a cavity 221 and have an opening 222 thereto. Opening 222 may be disposed facing substantially rearward, under normal operating conditions of the vehicle and/or rearview assembly 200. Further, transflective element 210 may be substantially disposed in, proximate to, and/or aligned with opening 222. Additionally, housing 220 may also form a cup 223. Cup 223 may be disposed at a substantially forward end of housing 220 under normal operating conditions of rearview assembly 200. Thus, cup 223 may be disposed at an end of housing 220 substantially opposite opening 222. Further, cup 223 may have a base portion 223*a* and a plurality of fingers 223*b*. The plurality of fingers 223*b* may extend from base portion 223*a*. Further, in conjunction with one another, the plurality of fingers 223*b* and base portion 223*a* may loosely define and/or encompass enclose a space 223*d* therein. As such, space 223*d* may be said to be within cup 223. Additionally, each of the plurality of fingers 223*b* may be configured to substantially deflect away from the enclosed space and rebound back. In some embodiments, fingers 223*b* may extend in a substantially forward direction from base portion 223*a*. Additionally, base portion 223*a* of cup 223 may have an aperture 223*c* formed therein. Aperture 223*c* may lead between cavity 221 and the loosely enclosed space 223*d*.

Mount assembly 230 may have a first end 231 and a second end 232. First end 231 may be configured to secure, directly or indirectly, to the vehicle. For example, first end 231 may secure to a windshield or a headliner of the vehicle. In some embodiments, first end 231 may be secured to the windshield via a windshield button. Second end 232 may be secured, directly or indirectly, to housing 220. Thus, mount assembly 230 may be configured to support rearview assembly 200. Further, second end 232 may be received by and disposed within cup 223. Accordingly, second end 232 may be substantially disposed in space 223*d*. In some embodiments, mount assembly 230 and housing 220 may be secured together such that housing 220 may articulate relative mount assembly 230. In some such embodiments, mount assembly 230 may comprise a ball portion 233 at second end 232. Ball portion 233 may be a semispherical knob. Further, ball portion 233 may be substantially received by and disposed within cup 223. Accordingly, ball portion 233 may be substantially disposed in space 223*d*. Furthermore, fingers 223*a* may substantially extend about at least part of ball portion 233 and grip ball portion 233 to substantially maintain a connection thereto and/or retain ball portion 233 within cup 223. Additionally, the interface between ball portion 233 and cup 223 may be such that housing 220 may articulate, at least in part, about ball portion 233. Second end 232 may also comprise a bracket 234 connected and fixed to ball portion 233. Bracket 234 may comprise a mounting surface 234*a* and/or an arm 234*b*. Arm 234*b* may extend from mounting surface 234*a*. Accordingly, bracket 234 may be substantially fixed relative first end 231 of mount assembly 230. Further, bracket 234 may extend from ball portion 233, through aperture 223*c*, and into cavity 221 via an arm 234*b* thereof. Additionally, arm 234*a* and aperture 223*c* may each have a width in a plane perpendicular to the first direction. The width of aperture 223*c* may be substantially greater than the width of arm 234*b*. As such, cup 223 may move or rotate about ball portion 233 to a substantial degree without base portion 233*a* impacting arm 234*b*. Thus, mounting surface 234*a* may remain in a substantially fixed position relative to mount assembly 230, and housing 220 substantially freely articulating thereabout. During articulation of housing 220, cup 223 may move relative to arm 234*b* to a maximum degree where base portion 233*a* contacts arm 234*b* at an outer boundary of aperture 233*c*. Accordingly, housing 220, and thus transflective element 210, may be moved without moving bracket 234.

In some embodiments, imager 110 may be disposed within cavity 221 of rearview assembly 200, defined, at least in part, by housing 220. In such an embodiment, imager 110 may be configured to capture light through transflective element 210 and produce the images. Further, in some embodiments, imager 110 may be substantially secured to mounting surface 234*a* of bracket 234. Accordingly, housing 220, and thus transflective element 210, may be moved without moving imager 110. Thus, the orientation of imager 110 is substantially fixed. Additionally, in some such embodiments, a circuit board 111 of imager 110 may also be secured to bracket 234. In other such embodiments, circuit board 111 of imager 110 may be disposed within cavity 221 and secured, directly or indirectly, to housing 220. In such an embodiment, circuit board 110 may be connected to imager 110 via a flexible connector such as a ribbon cable.

In some embodiments, light source 120 may be disposed within cavity 221 of rearview assembly 200, defined, at least in part, by housing 220. In such an embodiment, light source 120 may be configured to emit light through transflective element 210 to illuminate the scene. In some such embodiments, light source 120 may not be secured to mounting surface 234*a* of bracket 234. Accordingly, light source 120 may be secured, directly or indirectly, to housing 220. As such, light source 120 may be substantially moved with movement of housing 220 and transflective element 220. In other embodiments, light source 120 may be substantially secured to mounting surface 234*a* of bracket 234. Accordingly, housing 220, and thus transflective element 210, may be moved without moving light source 120. Thus, the orientation of light source 120 may be substantially fixed.

In some embodiments, rearview assembly 200 may further comprise a wire harness. The wire harness may terminate at one end in cavity 221. Additionally, the wire harness may be routed through aperture 223*c* and/or a channel through mount assembly 230.

Advantages of some embodiments of monitoring system 100 an/or rearview assembly 200 may have one or more advantages. For example, housing 220, and thus transflective element 210, of rearview assembly 200 may be articulated by the driver to better position rearview assembly 200 for viewing and/or to modify the field of view provided by transflective element 210, without moving imager 110 and/or light source 120. Imager 110 and/or light source 120 having a fixed position and/or orientation is advantageous because such a change would interfere with the monitoring system's 100 ability to accurately engage in some features, because movement of imager 110 and/or light source 120 would interfere with its calibration, which establishes known perspectives of the images and/or positions of structured lighting.

As used herein, the term "and/or," when used in a list of two or more items, means that any one of the listed items can be employed by itself, or any combination of the two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as "first," "second," and the like, are used solely to distinguish one entity or action from another entity or action, without necessarily requiring or implying any actual such relationship or order between such entities or actions.

The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

The term "substantially," and variations thereof, will be understood by persons of ordinary skill in the art as describing a feature that is equal or approximately equal to a value or description. For example, a "substantially planar" surface is intended to denote a surface that is planar or approximately planar. Moreover, "substantially" is intended to denote that two values are equal or approximately equal. If there are uses of the term which are not clear to persons of ordinary skill in the art, given the context in which it is used, "substantially" may denote values within 10% of each other, such as within 5% of each other, or within 2% of each other.

The term "transflective" generally refers to an optical configuration that reflects at least a portion of light incident from at least one side and transmits at least a portion of light incident from at least one side. In particular, "transflective" describes an optical element or component that has a non-zero level of transmittance with regard to a wave range of light and also has a non-zero level of reflectance in a region. The applicable wave range of light will vary based on the context. However, in the event the relevant wave range of light is not readily apparent, the wave range in light shall generally refer to visible light.

The term "transparent" is applied in the relative sense. "Transparent" refers to an optical element or material that is substantially transmissive of at wavelengths in question and thus generally allows light at such wavelengths to pass therethrough. The wavelengths in question will vary based on the context. However, in the event the wavelengths in question is not readily apparent, the wavelengths in question shall generally refer to visible light.

It is to be understood that although several embodiments are described in the present disclosure, numerous variations, alterations, transformations, and modifications may be understood by one skilled in the art, and the present disclosure is intended to encompass these variations, alterations, transformations, and modifications as within the scope of the appended claims, unless their language expressly states otherwise.

What is claimed is:

1. A rearview assembly, comprising:

a housing forming a cavity and an opening;

a transflective element substantially at least one of disposed in, proximate to, and aligned with the opening;

a mount assembly having a first end and a second end, the first end configured to secure to a vehicle, the second end secured to and configured to support the housing, the second end comprising a bracket extending into the cavity; and an imager and a light source disposed within the cavity and secured to the bracket;

wherein the bracket remains in a substantially fixed position when the mount assembly is secured to the vehicle and the housing is articulated.

2. The rearview assembly of claim 1, wherein the imager is secured to the bracket.

3. The rearview assembly of claim 2, wherein the light source is secured to the bracket.

4. The rearview assembly of claim 2, wherein the light source is not secured to the bracket.

5. The rearview assembly of claim 1, wherein the transflective element is a variably transmissive electro-optic element.

6. The rearview assembly of claim 1, wherein:

the second end comprises a semi-spherical ball portion;

the housing further comprises a cup configured to receive and grip the ball portion, at least in part;

the ball portion is disposed, at least in part, within the cup; and the housing may articulate relative the mount assembly at an interface between the ball portion and the cup.

7. The rearview assembly of claim 6, wherein the cup comprises a plurality of fingers substantially extending about, at least part of, the ball portion.

8. The rearview assembly of claim 7, wherein the plurality of fingers retain the ball portion within the cup.

9. The rearview assembly of claim 6, wherein the cup comprises a base portion having an aperture leading to the cavity.

10. The rearview assembly of claim 9, wherein the bracket extends into the cavity via the aperture.

11. The rearview assembly of claim 9, wherein the bracket is secured to the semi-spherical ball portion via an arm extending through the aperture.

12. The rearview assembly of claim 11, wherein a width of the aperture is substantially greater than a width of the arm.

13. The rearview assembly of claim 1, wherein the imager is disposed within the cavity and secured to the bracket.

14. The rearview assembly of claim 1, wherein the light source is disposed within the cavity and secured to the bracket.

15. The rearview assembly of claim 14, wherein the light source is configured to project structured light into a passenger compartment of the vehicle.

16. A rearview assembly, comprising:

a housing forming a cavity and an opening;

a transflective element substantially at least one of disposed in, proximate to, and aligned with the opening;

a mount assembly having a first end and a second end, the first end configured to secure to a vehicle, the second end secured to and configured to support the housing, the second end comprising a bracket extending into the cavity; and at least one of an imager and a light source disposed within the cavity and secured to the bracket;

wherein the bracket remains in a substantially fixed position when the mount assembly is secured to the vehicle and the housing is articulated;

wherein the second end comprises a semi-spherical ball portion, the housing further comprises a cup configured to receive and grip the ball portion, at least in part, the ball portion is disposed, at least in part, within the cup, and the housing may articulate relative the mount assembly at an interface between the ball portion and the cup;

wherein the cup comprises a base portion having an aperture leading to the cavity; and wherein the bracket extends into the cavity via the aperture.

17. The rearview assembly of claim 16, wherein the bracket is secured to the semi-spherical ball portion via an arm extending through the aperture.

18. The rearview assembly of claim 17, wherein a width of the aperture is substantially greater than a width of the arm.

19. The rearview assembly of claim 16, wherein the light source is configured to project structured light into a passenger compartment of the vehicle.

* * * * *